United States Patent [19]

Alafandi et al.

[11] 4,239,651

[45] Dec. 16, 1980

[54] CRACKING CATALYST AND METHOD OF PRODUCING THE SAME

[75] Inventors: Hamid Alafandi, Woodland Hills; Dennis Stamires, Newport Beach, both of Calif.

[73] Assignee: Filtrol Corporation, Los Angeles, Calif.

[21] Appl. No.: 935,628

[22] Filed: Aug. 21, 1978

[51] Int. Cl.³ .................. B01J 27/24; B01J 27/02; B01J 29/06

[52] U.S. Cl. .................. 252/438; 252/440; 252/455 R; 252/455 Z

[58] Field of Search .............. 252/438, 440, 455 R, 252/455 Z

[56] References Cited

U.S. PATENT DOCUMENTS

| | | | |
|---|---|---|---|
| 2,540,689 | 2/1951 | Pouet | 252/455 R |
| 2,701,793 | 2/1955 | Oshley | 242/455 R |
| 2,744,057 | 5/1956 | Emmett | 252/455 R |
| 2,897,246 | 7/1959 | Keizer et al. | 242/455 R |
| 3,065,054 | 11/1962 | Hoden et al. | 423/131 X |
| 3,346,512 | 10/1967 | Gladrow et al. | 252/455 Z |
| 3,346,512 | 10/1967 | Gladrow et al. | 252/455 Z |
| 3,423,332 | 1/1969 | Maher et al. | 208/120 X R |
| 3,437,604 | 4/1969 | Michalko | 252/455 Z |
| 3,493,519 | 2/1970 | Kerr et al. | 252/455 Z |
| 3,974,099 | 8/1976 | Lussier et al. | 252/453 |
| 4,139,493 | 2/1979 | Mickelson | 242/455 R |

*Primary Examiner*—Delbert E. Gantz
*Assistant Examiner*—William G. Wright
*Attorney, Agent, or Firm*—Philip Subkow; Bernard Kriegel

[57] ABSTRACT

This invention relates to exchanged ammoniated cogels having improved catalytic activity and process for producing the same.

12 Claims, 1 Drawing Figure

CRACKING CATALYST AND METHOD OF PRODUCING THE SAME

BACKGROUND OF THE INVENTION

Prior to the introduction of the exchanged crystalline zeolites of the faujasite type, as a catalyst for cracking of hydrocarbons, a commonly used catalyst was composed of a silica-alumina cogel containing from about 3 to about 25 percent by weight of $Al_2O_3$ on a volatile free basis.

Because of the substantially higher activity of the catalyst formed from crystalline zeolite, they have replaced to a large measure the silica-aluminum cogels as the primary component of a hydrocarbon conversion catalyst.

The literature relating to silica-alumina gels and their catalytic properties is extensive (see Iler, "The Colloid Chemistry of Silica and Silicates", Chapter VI, Cornell Press (1955) Ed.) and citations there given. See also, Erickson U.S. Pat. No. 2,872,410; Winyall U.S. Pat. No. 2,886,512; Wilson U.S. Pat. No. 3,124,541; Magee, et al., U.S. Pat. No. 3,433,748; Haden U.S. Pat. No. 3,065,054.

Maher, et al., U.S. Pat. No. 3,423,332 states that they produce an improved cracking catalyst from a "commercial silica-alumina" gel catalyst containing 13% $Al_2O_3$. The "commercial catalyst" is "suitably" formed by gelling sodium silicate solution with $CO_2$ and adding aluminum sulfate. The product is said to be activated by digesting the "commercial silica-alumina" catalyst with sodium hydroxide at a high pH at an elevated temperature to produce an amorphous product. The sodium content of the product is reduced by treatment with cations such as Ca, Mg, $NH_4$ and rare earth cations.

Lussier, et al., U.S. Pat. No. 3,974,099 forms a silica-alumina cogel from a mixture of sodium silicate and sodium aluminate. The resultant gel is acidulated. Alumina is precipitated by reaction with the excess sodium aluminate in the reaction mixture. The dried gel is exchanged with ammonium sulfate to reduce the $Na_2O$ content to less than 1%.

STATEMENT OF THE INVENTION

A useful process for producing such silica-alumina gels (see copending application Ser. No. 769,118, filed Feb. 16, 1977) now U.S. Pat. No. 4,142,991 is to react an alkali metal silicate such as sodium silicate with an aluminum salt solution and to make the solution alkaline by addition of ammonium hydroxide. Since the resultant gel contains a high sodium content, in order to make the gel suitable for use as a cracking catalyst, the gel is treated with an ammonium salt solution to reduce the sodium content of the gels to less than about 0.3 to 0.5% by weight expressed as $Na_2O$ on a volatile free basis.

Gels which have $NH_4^+$ cations associated herewith are here referred to as ammoniated gels.

We have discovered that in such ammoniated gels containing from about 40% to about 60% by weight of $SiO_2$ and from 60% to about 40% by weight of $Al_2O_3$, substantially free of Na+ cations, that we may increase the catalytic activity of the gel by reducing the associated ammonium ion content of the gel. This may be accomplished by reacting the ammoniated gel with a salt solution of a cation such as $H^+$, $NH_4^+$, rare earth or alkaline earth cations.

Additionally we have discovered that the reduction in the ammonium ion content is facilitated by the hydrothermal treatment of the ammoniated gel. This may be accomplished by high temperature steaming of the gel prior to exchange or by carrying out the exchange process at autogenous superatmospheric pressure.

The index of merit as to activity is the volume percent conversions determined by a microactivity test herein identified. The higher the volume percent conversion, after various temperature levels of high temperature steaming, the more active is the catalyst.

The activity may be measured by the microactivity cracking test described in the Oil and Gas Journal of Sept. 26, 1966, page 84, etc. and Nov. 22, 1975, page 60, etc.

In the following examples the conditions were as follows. The calcined pelleted catalyst was first steamed at temperatures and times specified below and then used in cracking of a petroleum fraction under the following conditions. Oil charge was a wide boiling range high sulfur feed stock (boiling range about 430° to 1000° F.). The catalyst to oil ratio equals 4. The weight hourly space velocity equals 16.45 grams of oil per gram of catalyst per hour. The temperature of the reactor is 910°. The percent conversion is reported as the volume of liquid condensate product of boiling point range of up to 421° F. based on the volume of liquid charge. The percent conversion after calcination of the catalyst in air three hours at 1050° F. and steamed for two hours at 1450° F. is termed M activity. When the calcined sample is streamed at 1500° F. for two hours, it is termed the S activity. When the calcined sample is first steamed for two hours at 1550° F., it is termed S+ activity.

The cracking test is preceded by subjecting the sample to high temperature steaming. When steamed at 1450° F. for 2 hours prior to testing, the volume percent conversion result is reported as M activity. When another sample is steamed at 1500° F. for 2 hours prior to testing, the volume percent conversion is reported as S activity. When another sample is steamed for 1550° F. for 2 hours prior to testing, the volume percent conversion is reported as S+ activity.

The process of our invention includes the treatment of ammoniated silicaalumina cogel by a hydrolytic treatment of the gel.

While a material reduction of the $NH_4^+$ content of the ammoniated gel and a substantial improvement of the microactivity results from a reduction in the $NH_4^+$ associated with the ammoniated gel, the magnitude effect of the reduction of the $NH_4$ content on the activity of the catalyst formulated from the exchanged gel depends on the nature of the cation and on the pH and temperature conditions of the reaction.

We have found that whether the reaction of the rare earth salts with the amorphous gel is under acid or alkaline conditions a reduction in the ammonium content results and an ammoniated gel is obtained and an improvement of catalytic activity results.

We prefer to employ the range earth salts and to react the ammoniated gel with the rare earth salt solutions at an acid pH of about 4 to about 5 so that rare earth ions are not precipitated as a separate compound and the rare earth cations become associated with the gel.

We prefer to employ the rare earth cations to exchange the hydrothermally activated gel, preferably by reacting the gel at superatmospheric autogenous pressures.

Instead of rare earth cations, we may use alkaline earth cations such as Mg, and obtain an improvement in the catalytic activity of the gel.

Presumably the cations is associated with the treated gel in some manner. The term "associated" is employed here to describe that there is some sort of physical-chemical force between the cations and the treated gel whether or not the process is an exchange process where the ions are exchanged equivalent for equivalent.

The term "associated" in this specification and claims is used in this context. For purposes of describing the result of the process of treating the ammoniated gel with water or a solution of the salt, whereby the $NH_4$ content of the gel induced will refer to the process as an "exchange" and the cation as "associated" with the gel.

The preferred exchange results in the production of a silica-alumina cogel which has a sodium content of less than 1% and preferably less than 0.5% by weight of the gel expressed as $Na_2O$ on a volatile free basis and an ammonium ion content expressed as $NH_3$ less than about 2.5% by weight of the gel on a volatile free basis. Preferably the ammonium content is reduced as low as is practical and we have found that reducing the $NH_4$ content to substantially less than 0.5%, as above, a catalyst of superior activity is produced as is described below.

We prefer to hydrothermally treat the silica-alumina cogel in the presence of $H_2O$ as liquid water or as steam at temperatures in the range of about 300° F. to 1550° F., either under superatmospheric pressure in a closed vessel or with steam at atmospheric or superatmospheric pressure. When employing the steam, the gel is preferably steamed at a temperature in the range of about 500° F. to about 1550° F. for several hours, preliminary to the exchange process. When operating under autogenous pressure the gel is mixed with water or water containing the selected salt solution and then heated under autogenous superatmospheric pressure in a closed vessel. In such case a temperature is selected to be in the range between about 300° F. to about 600° F.

The exchanged gel may be combined with a matrix material, such as kaolin clays, ball clay or halloysite or acid treated halloysite or silica gel or for example the hydrated aluminas such as pseudobochimite or the ammoniated gel which has not been exchanged. Such matrix materials, although each having catalytic activity substantially less than the exchanged gels of our invention, have as they do where they have been used with faujasite type catalysts are useful additives. Such matrix materials may be used in ratios of from about 5% to 95% of the mixture of the exchanged gel of our invention and the matrix on a volatile free basis.

We prefer to employ the matrix in more limited ratios for example from about 5% to about 25% of the matrix and from about 95% to about 75% of the exchanged gel.

The cogel which we prefer to treat by the process of our invention to form the catalyst of our invention may be produced by any of the methods used in the prior art to form such cogels in which the treatment results in a gel having an ammonium ion associated with gel as in the ammoniated gel referred to above.

The cogel may be formed by treating a mixture of silica hydrosol with aluminum sulfate in the ratios to produce a gel of the desired $SiO_2/Al_2O_3$ ratio. The mixture may then be brought to a pH of about 8.5-9 using $NH_4OH$. The gel may then be heated to about 180°-200° F., cooled, filtered and washed until the wash water is substantially free of anions.

We prefer to coprecipitate the silica-alumina hydrosol to form the gel from a mixture of sodium silicate and aluminum sulfate made alkaline with ammonium hydroxide. The gel is exchanged to reduce the sodium content as is more fully described below.

We have found that the improvement in the catalytic activity of the exchanged gel of our invention depends on the silica to alumina ratio of the cogel. The ammonia content of the ammoniated gel of our invention depends on the silica to alumina ratio of the gel. The catalytic activity attainable by our invention is substantially greater as the weight ratio is in the range of about 40% to about 60% by weight of $SiO_2$ to about 60% to about 40% by weight of $Al_2O_3$.

The effect of the reduction of the $NH_4^+$ cation content on the activity of the catalyst by reaction with rare earth is further described below taken in connection with FIG. 1.

EXAMPLE 1

The silica-alumina gel is prepared as follows: 5,017 grams of sodium silicate (28% $SiO_2$—8.9% $Na_2O$ by weight) equivalent to 1,440 grams of $SiO_2$ was dissolved in water. The slurry solution was acidified to a pH of 11 with sulfuric acid. 26,896 grams of an aluminum sulfate solution (equivalent to 1,560 grams of $Al_2O_3$) was gradually added to the acidified slurry with constant agitation. The pH at the end of the addition of the aluminum sulfate should be in the range of about 3 to about 3.5. The solution was passed through a colloid mill to be well homogenized. The homogenized solution was made alkaline with ammonium hydroxide with constant and vigorous agitation to adjust the mixture to a pH of about 8.5 to about 9.

The mixture is vigorously stirred and the pH is maintained in the range of about 8.5 to about 9 by suitable adjustment for about 1 hour to insure uniformity of the mixture. It is then heated to a temperature of about 75° to 80° C. for about 30 minutes and then immediately filtered and the filter cake washed with hot distilled water of about 80° C. The wash slurry is then slurried to a solid content of about 5% in distilled water which contained about 2% of ammonium nitrate and then filtered. The filter cake was then again slurried with ammonium nitrate solution as in the last previous step. The filter cake from the last step was again reslurried in an ammonium nitrate solution as above and filtered. The filter cake from the last filtration above was washed with distilled water.

The silica-alumina gel thus produced is preferably maintained in a sealed container prior to use in the catalyst of our invention. It should be used as promptly as possible since aging of the gel will impair its properties in producing a good attrition resistant catalyst.

The gel as produced in Example 1 analyzed on a volatile free basis as follows:
$SiO_2$=48.7% by weight
$Al_2O_3$=51.1% by weight
$Na_2O$=0.27% by weight
$NH_3$=3.67% by weight Assuming that the $NH_3$ is in an exchange position on the gel, this would appear to indicate that the exchange capacities of the gel are 215 milli equivalents per hundred grams.

It has a pore volume of 0.92 cc per gram as determined as described n E. P. Barrett, et al., J.A.C.S., Vol 73, pp. 373 et seq (1951).

EXAMPLE 2

The above cogel was pelleted and tested by a micoroactivity test identified above after steaming at 1450° F. for 2 hours (M activity) and again another sample after steaming at 1500° F. for 2 hours (S activity) and again another sample after steaming at 1550° F. for 2 hours (S+ activity). The results are reported as volume percent conversion.

The results obtained were as follows:

|  | M | S | S+ |
|---|---|---|---|
| Volume % conversion | 43.0 | 36.5 | 39.9 |

The gel was also mixed with acid treated halloysite (See Secor 2,935,463 and 3,446,727) in the ratio of 90% by weight of the dried gel and 10% by weight of the dry halloysite. The mixture was tested as above with the following results:

|  | M | S+ |
|---|---|---|
| Volume % conversion | 47 | 44 |

EXAMPLE 1

In this example the gel as in Example 1 was exchanged with magnesium chloride at a pH of 4 under autogenous pressure at a temperature of 400° F. for 2 hours, cooled, filtered and washed substantially free of chloride ions. The filter cake was analyzed and had the following composition on a volatile free basis:

$Al_2O_3$ = 50.4% by weight
$SiO_2$ = 46.9% by weight
$Na_2O$ = 0.09% by weight
$NH_3$ = 0.88% by weight
$MgO$ = 0.56% by weight
$NO_3$ = 0.64% by weight 90% of the gel was mixed with 10% acid treated halloysite and tested as in Example 2 with the following results:

| M | S+ |
|---|---|
| 56% | 45% |

According to our invention, the degree of improvement obtained by the process of our invention is dependent in the following result effective parameter to wit: the $SiO_2:Al_2O_3$ ratio of the ammoniated gel and the cation employed in the reduction of the ammonium ion in the ammoniated gel. An additional improvement is obtained by hydrothermally activating the gel.

Our invention claimed in this application relates to a process of treatment of ammoniated silica-alumina gels of low sodium content, e.g. having a weight ratio in the range of less than about 0.5% expressed as $Na_2O$ and containing $NH_4$ cations associated with the gel in amount expressed as $NH_3$, based on the gel on a volatile free basis substantially in excess of about 2.5% by weight with alkaline earth cations to reduce the ammonium content to less than about 2.5% by weight by exchanging said $NH_4^+$ cation with a monovalent or polybalent cation to produce a highly active cracking catalyst containing less than about 2.5% by weight of the gel of $NH_4^+$ cation expressed as $NH_3$.

Our invention includes the hydrothermal treatment of the gel to activate the gel, either by high temperature steaming or hydrothermal treatment as by heating to temperatures of 300° F. to about 600° F. and at superatmospheric autogenous pressure.

Preferably the exchange is carried out under superatmospheric pressure at a pH in the range of about 4 to about 5.5 at a temperature of about 350° F. to 600° F.

Instead of using the exchanged gel either alone or mixed with a relatively catalytically inactive constituent acting as a matrix such as clay, silica gel or alumina gel or other inorganic oxide such as gel or cogel, the exchanged gels produced according to our invention may be combined with an exchanged zeolite such as the ammonium or the rare earth or rare earth and ammonium exchanged zeolites either of the faujasite type such as the X or Y zeolite or other crystalline aluminosilicate zeolites such as mordenite, chabazite, erionite and zeolite A. The mixture may be in the ratio in the range of about 1% to less than about 50% by weight of the zeolite suitably exchanged, if necessary, to a sodium content as in the case of catalysis of the prior art and the above exchanged silicaalumina gel. In the case of a rare earth exchanged Y with a $Na_2O$ ratio of less than 5% by weight on a volatile free basis, we may use a minor proportion of about 1 to less than 50% of zeolite based on the mixture of gel and zeolite; a suitable mixture being about 20% by weight of the zeolite to 80% by weight of the cogel all on a volatile free basis. Such mixtures may suitably be combined with matrix material for zeolites in the prior art.

The above procedures for reducing the $NH_4$ content of the ammoniated gel may be employed in combination. Thus the ammoniated gel of Example 1 may be exchanged at atmospheric pressure as in Example 3 and is re-exchanged one or more times in multiple steps. The atmospheric exchanged gel of Example 3 may be re-exchanged under pressure as in Example 6. The pressure exchanged gel may be re-exchanged under pressure under similar procedures as in Example 6. The exchanged gel of Example 3 may be steamed as in Example 5 and exchanged as in Example 5.

While we prefer to employ rare earth as the exchange ion (see our copending applications, Ser. No. 044,673 and Ser. No. 003,879) we may also employ other cation to reduce the ammonium content such as alkaline earth cations as described above and metals of the transition elements of Group 8 of the periodic table.

We claim:

1. The process of producing a cracking catalyst which comprises forming a silica-alumina gel having a $SiO_2:Al_2O_3$ molar ratio from about 1.5 to 1.7 and associated with sodium ions and mixing said gel with an ammonium salt solution, separating an ammoniated gel from the solution, said gel containing $NH_4+$ ions associated with the gel in an amount in excess of about 3% by weight expressed as $NH_3$ and sodium expressed as $Na_2O$ less than about 1% based on the gel on a volatile free basis and treating said ammoniated gel by exchanging the ammonium cation with a solution of alkaline earth metal salt at a pH of about 5.5 or less to reduce the $NH_4$ content of the gel to less than about 2.5% by weight expressed as $NH_3$ and the Na expressed as $Na_2O$ to less than about 1% by weight of the exchanged gel all on a volatile free basis and separating said exchanged gel.

2. A process for producing an active cracking catalyst which comprises exchanging an ammoniated silicaalumina gel containing NH$_4$ ions associated with the gel in an amount, in excess of 2.5% of the weight of the gel and Na expressed as Na$_2$O less than about 0.5% by weight all on a volatile free basis, and having a SiO$_2$:Al$_2$O$_3$ molar ratio in the range of about 1.1 to about 2.6, with a solution containing an alkaline earth metal cation at a pH of about 5.5 or less, and separating a gel containing NH$_4$ ion in amount substantially less than about 2.5% expressed as NH$_3$ on a volatile free basis.

3. The process of claim 2 in which the exchange reduces the NH$_4$ content of the gel to less than 1.5% expressed as NH$_3$ on volatile free basis.

4. The process of claim 2, 3 or 1 in which the ammoniated gel and the solution is heated at superatmospheric pressure at a temperature between about 300° F. and about 600° F.

5. The process of claim 2, 3, or 1, in which the exchange is at a pH of about 5.5 or less.

6. An ammoniated silica-alumina gel having a SiO$_2$:Al$_2$O$_3$ molar ratio in the range of about 1.1 to about 2.6 and containing ammonium cation in amount substantially less than 2.5% by weight expressed as NH$_3$ and sodium expressed as Na$_2$O of less than about 0.5% by weight on a volatile free basis, in which the gel has associated therewith alkaline earth cations.

7. A catalyst comprising a major percent by weight of on ammoniated gel according to claim 6 and minor proportion of a matrix.

8. A catalyst comprising a major percent by weight of an ammoniated gel according to claim 6 and a minor proportion of a crystalline aluminosicate zeolite.

9. A catalyst comprising a major percent by weight of an ammoniated gel according to claim 6 and a minor proportion of a zeolite containing sodium expressed as Na$_2$O of less than 5% by weight all percentages on a volatile free basis.

10. An alkaline earth exchanged ammoniated silica-alumina gel having a SiO$_2$/Al$_2$O$_3$ molar ratio in the range of about 1.1 to about 2.6 and containing ammonium cation in amount substantially less than 2.5% by weight expressed as NH$_3$ and sodium expressed as Na$_2$O of less than about 0.5% by weight expressed as the oxide on a volatile free basis.

11. A catalyst comprising a major percent by weight of an ammoniated gel according to claim 10 and a minor percent of a matrix.

12. A catalyst comprising a major percent by weight of an ammoniated gel according to claim 10 and a minor proportion of a crystalline aluminosilicate zeolite.

* * * * *